(12) United States Patent
Gorti et al.

(10) Patent No.: US 11,164,193 B2
(45) Date of Patent: *Nov. 2, 2021

(54) PROXY-BASED PROFILE MANAGEMENT TO DELIVER PERSONALIZED SERVICES

(71) Applicant: AT&T Intellectual Property I, L.P., Atlanta, GA (US)

(72) Inventors: Sreenivasa Rao Gorti, Austin, TX (US); David Patron, Frisco, TX (US); Paul Vanvleck, Austin, TX (US); Javier B. Arellano, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/986,769

(22) Filed: Aug. 6, 2020

(65) Prior Publication Data

US 2020/0380534 A1    Dec. 3, 2020

Related U.S. Application Data

(63) Continuation of application No. 15/788,251, filed on Oct. 19, 2017, now Pat. No. 10,769,643, which is a
(Continued)

(51) Int. Cl.
*G06Q 30/00* (2012.01)
*G06Q 30/02* (2012.01)
(Continued)

(52) U.S. Cl.
CPC ......... *G06Q 30/02* (2013.01); *G06Q 30/0222* (2013.01); *G06Q 30/0253* (2013.01);
(Continued)

(58) Field of Classification Search
CPC ............... G06Q 30/02; G06Q 30/0222; G06Q 30/0253; G06Q 30/0267; G06Q 30/0269;
(Continued)

(56) References Cited

U.S. PATENT DOCUMENTS 5,794,210 A    8/1998  Goldhaber et al.
6,370,629 B1*  4/2002  Hastings ............. G06F 21/6218
                                                   711/163
(Continued)

FOREIGN PATENT DOCUMENTS

| EP | 1185923 B1 | 3/2004 |
| WO | 0130058 A3 | 6/2001 |
| WO | 0227421 A3 | 10/2003 |

OTHER PUBLICATIONS

"International Search Report and Written Opinion for PCT/US2005/026078", dated Dec. 22, 2005, 7 pages.
(Continued)

*Primary Examiner* — Sun M Li
(74) *Attorney, Agent, or Firm* — Guntin & Gust, PLC; Douglas Schnabel

(57) ABSTRACT

A method includes receiving, at a server associated with a merchant, an identification token associated with a mobile device located in a service environment associated with the merchant, and receiving an address of a profile agent associated with and distinct from the mobile device. The identification token includes an opaque token generated by a source other than the mobile device. The method includes sending to the profile agent a request for a user profile associated with the mobile device, where the request includes the identification token, and receiving an opaque user profile responsive to the request. The method includes sending a personalized offer associated with the merchant to the profile agent based on the opaque user profile. The profile agent causes application of preferences and policies
(Continued)

associated with the mobile device to the personalized offer to determine whether to forward the personalized offer to the mobile device.

20 Claims, 1 Drawing Sheet

Related U.S. Application Data continuation of application No. 10/898,145, filed on Jul. 23, 2004, now Pat. No. 9,854,058.

(51) Int. Cl.
    *H04L 29/08*      (2006.01)
    *H04W 4/029*      (2018.01)
    *H04W 4/21*      (2018.01)

(52) U.S. Cl.
    CPC ..... *G06Q 30/0267* (2013.01); *G06Q 30/0269* (2013.01); *H04L 67/306* (2013.01); *H04W 4/029* (2018.02); *H04W 4/21* (2018.02)

(58) Field of Classification Search
    CPC ...... H04L 67/306; H04W 4/029; H04W 4/21; H04W 4/02
    See application file for complete search history.

(56) References Cited

U.S. PATENT DOCUMENTS

| | | | |
|---|---|---|---|
| 6,400,806 | B1 | 6/2002 | Uppaluru |
| 6,714,778 | B2 * | 3/2004 | Nykanen ............... H04L 67/306 |
| | | | 455/414.1 |
| 7,200,566 | B1 * | 4/2007 | Moore ................... G06Q 30/06 |
| | | | 705/26.3 |
| 7,249,100 | B2 | 7/2007 | Murto et al. |
| 2001/0018349 | A1 | 8/2001 | Kinnunen et al. |
| 2002/0010756 | A1 | 1/2002 | Oku |
| 2003/0149781 | A1 | 8/2003 | Yared et al. |
| 2004/0128546 | A1 | 7/2004 | Blakley et al. |
| 2004/0249855 | A1 | 12/2004 | Detweiler et al. |
| 2005/0278547 | A1 * | 12/2005 | Hyndman .......... G06Q 20/4014 |
| | | | 713/185 |
| 2006/0150180 | A1 | 7/2006 | Schmidt et al. |

OTHER PUBLICATIONS

Quintana, Yuri, "Knowledge-Based Information Filtering of Financial Information", University of Western Ontario, May 1997, 6 pages.

Woerndl, Wolfgang, "Requirements for Personal Information Agents in the Semantic Web", The Technical University of Munich, IFIP International Federation for Information Processing 2003, 6 pages.

* cited by examiner

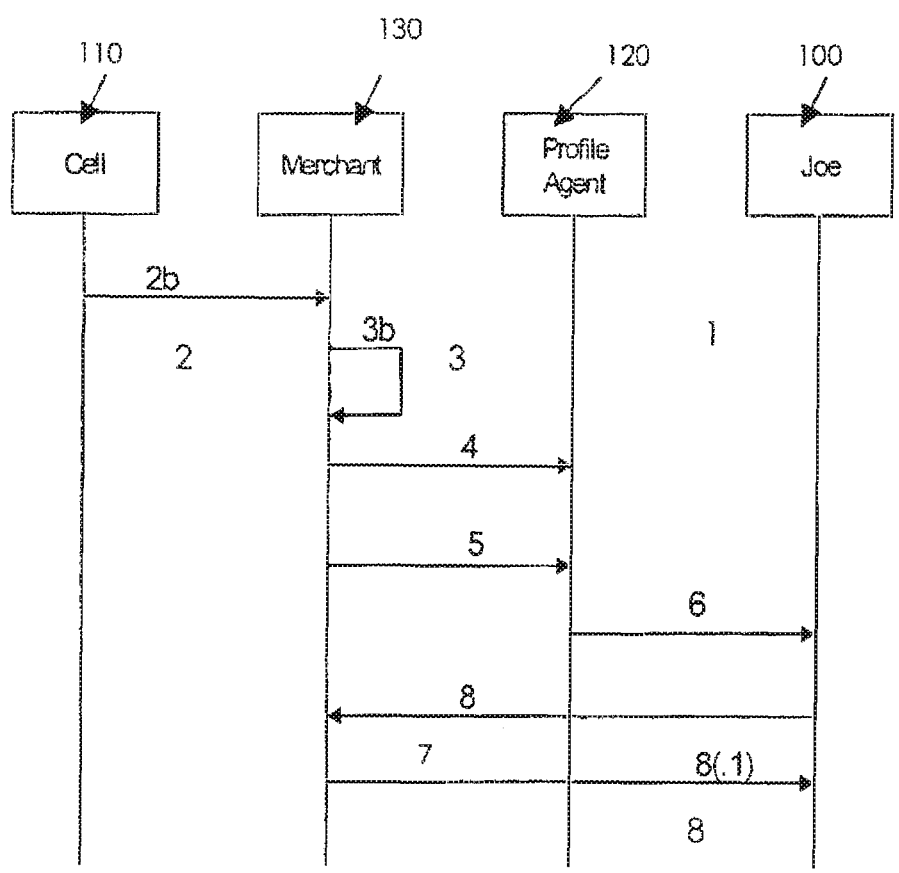

PROXY-BASED PROFILE MANAGEMENT TO DELIVER PERSONALIZED SERVICES

CROSS-REFERENCE TO RELATED APPLICATION(S)

This application is a continuation of U.S. application Ser. No. 15/788,251, filed Oct. 19, 2017, which is a continuation of U.S. application Ser. No. 10/898,145, filed Jul. 23, 2004 (now U.S. Pat. No. 9,854,058), which are incorporated herein by reference in their entirety.

FIELD OF THE DISCLOSURE

The present disclosure relates to the Internet, and more particularly to network architecture and platforms for the delivery of personal services and push ecommerce.

BACKGROUND

It is expected that, before long, the mobile terminal will become for many people the primary access point to the Internet and the enabler of secure location-based and personalized services. All service or content providers will, therefore, have the opportunity to develop and provide end-user services that securely package and attune content to the user's location and needs in a mobile environment.

To that end, agents are regarded as very promising, especially in connection with the explosion of information and services on the Internet. Agents are software that act on behalf of a principal (a user or subscriber) to reach a goal, perform a task, or solve a problem for the user. For example, agents might filter information for the user, determining which news articles, documents, Web-sites, and the like, are interesting for the user on the basis of a user-profile that stores the user's interests.

Particularly relevant to the present disclosure are agents that will be referred to as "proxy agents." The term proxy in connection with the present disclosure has a particular connotation, as set forth below.

Proxies mediate requests between entities, such as, for example, between a client application (browser) and a server. For the purposes of the present disclosure, a proxy agent acts on behalf of a user to accept and filter solicitations made to the user by other entities such as service providers and applications. The proxy agent serves two purposes: (a) it protects user privacy and (b) it enforces user's policies and communicates user preferences for personalization.

User profile (and other identity-based) information is widely used to deliver personalized web-based services. Currently, such profile information is specific to particular services, resulting in a fragmentation that requires a user to specify and update their profiles with multiple service providers. Identity architectures such as .NET My Services and Liberty Alliance propose third-party profile services, offered by a Profile Service Provider (PSP) to multiple other service providers linked in a federation. These architectures primarily address a relatively static network of service providers that have agreed to identity federation. They address the fragmentation problem at the expense of requiring identity federation, and are not well suited to dynamic push-commerce opportunities targeted at mobile users.

Specific embodiments of the present disclosure exploit the advantages of proxy agents for the delivery of personalized services to mobile Web users without requiring federation membership, i.e., static business alliances and identity relationships envisioned in standards like Liberty Alliance.

BRIEF DESCRIPTION OF THE DRAWINGS

The present disclosure is further described in the detailed description that follows, by reference to the noted drawing, by way of non-limiting examples of embodiments of the present disclosure, in which reference numerals represent parts throughout the drawing, and in which:

FIG. 1 is a schematic diagram of exemplary interactions between participants in a specific embodiment of a platform architecture of the present disclosure.

DETAILED DESCRIPTION

In view of the foregoing, the present disclosure, through one or more of its various aspects, embodiments and/or specific features or sub-components, is thus intended to bring out one or more of the advantages that will be evident from the description. The present disclosure is described with frequent reference to platform architectures. It is understood, however, that platform architecture is merely an example of a specific embodiment of the present disclosure, which is directed generically to exploiting digital information exchange technologies for personalized ecommerce based on user profiles, within the scope of the disclosure. The terminology, examples, drawings and embodiments, therefore, are not intended to limit the scope of the disclosure.

User profile information, though widely used to deliver personalized web-based services, is currently fragmented among multiple service providers. Identity platforms such as .NET My Services and Liberty Alliance would be third-party profile services, offered by a Profile Service Provider (PSP) to multiple other service providers linked in a federation. PSPs, therefore, overcome the fragmentation problem at the expense of requiring identity federation. Also, PSPs are not well suited to dynamic push-commerce directed to mobile users. By way of distinguishing the present disclosure from federation membership identity providers, the Liberty Alliance Project is described below.

The Liberty Alliance Project is developing standards for federated identity management that emphasize security, and privacy of the member users. Identity federation as specified by the Liberty Alliance Project is a controlled method by which partnering companies provide customer service to a qualified group of members for defined business transactions.

The technology used in web services allow a businesses to offer new functionality to their partners and customers, facilitate existing relationships between disparate computing systems, and provide common interfaces to systems, enabling composite computing systems to be built that span geographical locations and business functions. Web services technologies provide a uniform interface on top of existing computer systems. They offer a programming language-neutral and operating environment-neutral model. Web services offer a standard external interface to internal computer systems, for automated and inexpensive interactions among computer systems. The interfaces are developed and deployed more quickly than traditional computer systems.

Passing of standardized messages between systems enables Web services. A human resources system, for example, might pass a standard message telling an insurance provider to "enroll employee Sita Rama in XYZ insurance plan." The insurance provider might then respond, telling the human resources system that it had "successfully added Sita Rama to insurance plan XYZ." To pass standard messages, businesses must agree on standard ways of communicating these messages. To do that, businesses typically agree on a framework for implementing web services. The Liberty Identity Web Services Framework (ID-WSF) is a proposed framework.

A web service may be broken down into different layers. One layer is the application layer. It is responsible for the actual service provided by the application. In a human resources interface, for example, the application layer would be responsible for defining the standard message that it uses to enroll an employee in an insurance plan, and the response message received upon enrollment. The bundled messages form an application protocol.

An application needs instructions about where and how to send a message. If the human resources application and the insurance enrollment system are performed by different businesses, then messages will be passing over some network connection between the two businesses. The system will need to verify that the "enrollment of Sita" message was sent actually came from Sita's company. Additionally, both businesses want to protect all the messages that they send to each other from prying eyes. A framework layer, therefore, manages the functions of verification and privacy protection and other functions that all the networked business share. The Liberty ID-WSF specifications provide a framework layer, and the common functions are listed below:

i) Authentication—ensures that service requesters are authenticated to be authorized users for access to the provided service. Authentication depends on the notion of identity. i.e., who is the person accessing the service and who is the message about?

ii) Message protection mechanisms: both clients and providers of Web services would like to know that messages they send cannot be intercepted by a malicious entity and then either be modified or cached and then replayed.

iii) Service discovery and addressing: to make use of a particular web service, an application needs to discover where the Web service is located to correctly address messages to the service.

iv) Policy: service providers may have particular requirements that apply to service requesters. These requirements, which can be quite varied, can be grouped in the general category of policy. Additionally, individual users of software applications, or the service client software applications themselves, may have particular policies that they must apply in accessing a service. Policies may relate to many factors, such as the privacy requirements of a user, security requirements of a service provider or client, and so forth.

v) Common data access protocols: multiple applications might define similar operations. For example, a "query" message could equally apply to an insurance plan in the insurance system (who is enrolled in plan XYZ?) or another system at the same company, such as the corporate address book (what is Sita's phone number?). It is efficient to define a standard interface to be used and extended by application systems.

vi) Transport protocols: generally, web services are made available over a network. Often, the network is the Internet, and services may thus be offered using the HTTP protocol and carried in a standard SOAP message. Liberty provides a binding of application messages to SOAP that may be carried over HTTP.

Finally, web services may be classified, based on their usage of identity-related information, as identity-based, identity-consuming, or basic (which does not depend on or expose any identity-related information). An identity-based service application is one that exposes an interface on behalf on an (online) identity. For example, Sita may have her business calendar on the corporate intranet—it is her calendar—if you want to know what Sita is doing, you have to access her calendar, not just anyone's calendar.

An identity-consuming service application is one that requires, or is enhanced by, knowledge of some data connected with a subscriber's identity. For example, if Sita wants to find out the weather forecast for her local weather, the weather forecasting service could be enhanced by knowing Sita's postal code—it doesn't need to know who Sita is, nor is it working specifically on her behalf, it just needs some piece of information about her to give her the local weather forecast.

A stock quote service that delivers the current price of a particular company's stock is an example of a basic web service. It does not need to know who the person is who is requesting the quote in order to configure the quote. It just needs to know the name or abbreviation of the company whose stock price is requested.

The Identity Federation Framework (ID-FF) of the Liberty Alliance Project is based on the OASIS SSTC SAML standard [SAML], and specifies a third-party authentication model, where individual services rely upon assertions generated by an identity provider. Thus, the service is not required to directly authenticate the user (although ID-FF does not prevent this). The direct authentication may be performed by an entity whose sole responsibility is to identify the user based on direct authentication. This model, of course, requires that the service provider trusts the identity provider.

Liberty ID-FF defines a protocol that allows a service provider to generate an authentication request and receive an authentication assertion in response from the identity provider. In addition, Liberty specifies bindings for that protocol, by which the protocol is performed in a web-based context (either solely over HTTP, or with some communication using SOAP+HTTP).

In addition to the protections available via ID-FF, Liberty provides standard SOAP-based authentication and single-sign-on service interfaces to an identity provider. These can be used by SOAP-based applications to acquire credentials for use at other service provider applications. The Liberty Authentication Service allows a SOAP client application to authenticate to the service via any of the authentication methods specified by the IETF's Simple Authentication and Security Layer specification, thus standardizing the authentication methods used. In all of these cases, the authentication results in a SAML assertion being used to communicate the authentication event.

Once an identity provider has authenticated the user requesting service access, they can claim to know the identity of that user. The user has an account with the identity provider. The service provider may or may not know the identity of the user to whom they are providing service (if they have not, themselves, directly authenticated the user, and found them to have an account with the service provider) but they will receive a SAML assertion from the identity provider, attesting to the identity provider's knowledge of the user's identity.

It is possible, regardless of whether an account exists for the user at the service provider, for an identifier to be established between the service provider and the identity provider based upon direct authentication of the user by the identity provider and the user's account with that identity provider. If such an identifier is subsequently re-used by the service provider, then a federated name identifier is said to exist. The federated name identifier is shared for some period of time by the identity provider and the service provider. A name identifier could be something such as an email address or a string of digits that uniquely identifies a user to either an identity provider or a service provider.

Several concerns arise with respect to name identifiers. Sharing some commonly used identifier among services providers, such as an email address, may not cause any concern. However, when sharing a globally-known identifier among separate business entities, the user's privacy may be compromised. A user may be fine with the idea that provider A and provider B both know who she is, but does not want provider C to know the same identifier that provider A and B share (for example, she may wish to offer different email addresses to different providers).

Liberty permits opaque (not necessarily visible to all parties) privacy-protected name identifiers. These identifiers cross business entities without compromising the privacy of the user or leaking data (such as his or her email address). Particular resources (a personal profile document or set of location attributes) may be associated with an identity, so Liberty provides an opaque, privacy-protected resource identifier. This combines the concept of a user's identity (and name identifier) with the idea of a specific personal profile resource belonging to the identified user.

When a service accepts a request, it needs to verify that the request is a genuine one from a party that it trusts to deliver the request. Liberty specifies ways in which this can be assured. These range from transport security mechanisms to ensure that the underlying transport is secure (for example, by use of TLS [RFC2246]), to token-based mechanisms (such as the propagation of a SAML assertion in a WS-Security [wss-sms, wss-saml] SOAP header block). Additionally, Liberty specifies a SOAP binding ([Liberty-SOAPBinding]) that includes header blocks that provide message threading (so that a message received may be correlated to a message that was sent) and the ability for a message sender to make a claim about the sender's identity, which can be confirmed by the message recipient.

There are a number of ways in which a service may be discovered. Liberty specifies a discovery service [Liberty-Disco] and a protocol and profile by to access a discovery service by a service requester. The Liberty framework itself does not require explicit discovery, and other methods (such as UDDI service registry) may be employed, particularly for the discovery of basic web services. It should be noted that the Liberty discovery service has a special property—it is available to discover services belonging to a particular user, so it is ideal for the discovery of identity-based web services. And, of course, it uses privacy protected name and resource identifiers to provide that functionality.

The methods result in a service requester having a) the service endpoint to which they should direct a service request, b) a credential that will convince the service provider that the requester should be granted access, and c) policies of the service provider that would be required for them to gain access (e.g., does the service provider require a particular secure transport, such as SSL/TLS?).

The Liberty WSF provides a number of places where policy is specified and enforced. Specifically, a usage directive SOAP header block is provided so that a particular service request may be handled according to the requested policy; placeholders for policy information pertaining to service access in both the Liberty discovery service, and individual metadata documents related to particular service providers are also provided. In addition, policy may be indicated in WSDL [WSDLv1.1] documents associated with a particular application service provider. Liberty does not specify any particular policy language, but provides placeholders where such policy languages may be employed.

The Liberty Data Services Template Specification (DST) defines common data access protocols to allow the querying and modification of arbitrary data items according to the application. An application uses or extends the DST protocol to provide a basic query/modify interface to application clients without having to design or code such functionality itself.

Although the prerequisite to active federated SSO is a business agreement and trust between company networks, the actual linking of the disparate identities depends on an action on the part of the Principal. There is no valid cross-domain access until the Principal registers his/her validated identities, requiring initial successful login to both federated SSO domains. Just as the opaque identifier lessens the risk of liability for businesses, so too does it lessen the risk of identity theft/fraud for the individual. The opaque identifier itself is useless outside of this specific company pairing. There is no transitive property to this value. Furthermore, the valid identifier must originate and receive positive assertion from the appropriate Identity Provider validated with current credentials; it is not valid with the Service Provider in any other context.

In addition to the basic framework provided for all web services, identity services deliver messages to a service offered on behalf of some identity, such as a personal profile where an address is stored. Thus, they have to identify the subscriber in some way. Of course, they should identify the subscriber/user in some way where only the application client and the application service know that it is the user's profile being requested or modified. Liberty uses the resource identifier to label that identity. For Service clients to discover the location of the user's profile service, they contact the user's discovery service to acquire a resource identifier for the profile service. The services may be accessed via query and/or modify type operations. The Liberty DST protocol can be used to access an identity-based service where the client, such as an identity-consuming weather forecasting web service, wishes to determine the postal code in order to deliver a weather forecast for the area where the subscriber lives.

In contrast to a profile service that requires federation identity, the current disclosure contemplates a third-party profile service based on a proxy server model, where the user's profile service resides at a URL. A profile service of the present disclosure augments location-based services offered by service providers targeting mobile users via, for example, wireless and Wifi Networks. Additional personalization is driven by identity/profile services. The disclosure does not require all participants in the scenario to share an identity or profile (i.e., static federation is not required). The user establishes a single profile with a trusted provider, hands-off solicitations to a profile agent that operates on behalf of the user to apply policies and preferences. The agent also provides privacy and anonymity (opaqueness).

A Personalized Services Environment (PSE) has been proposed to customize mobile services. In a PSE users roam between different wireless access networks and receive services according to their personal profiles and environmental contexts. Generally, there are service providers and network providers in the PSE who facilitate the delivery of customized or personalized mobile services. Elements of the environment include users that have personal preferences and polices configured in their agent; end-devices such as a cell phone, PDA, Blackbury and so forth; network operators that provide servers and connectivity; and service providers such as merchants or retail machines.

Agents are defined within the scope of a platform. The agent platform can be distributed across machines (which do not even need to share the same OS) and configuration can be controlled via a remote GUI. The configuration can be even changed at run-time by moving agents from one machine to another one, as and when required.

Mobile agents are software abstractions that can migrate across the network (hence mobile) representing users in various tasks (hence agents). A mobile agent may start its execution at a location, migrate to another location, and continue its execution at the original location. Mobile-agent systems differ from process-migration systems in that the agents move when they choose, typically through a "move", "jump" or "go" statement, whereas in a traditional process-migration system the system decides when and where to move the running process (typically to balance CPU load).

Two types of mobile agents can be distinguished: (1) Single-hop agents. They migrate from their home platform to one specific other platform and remain there for monitoring or return to the home platform after doing their task; and (2) Multi-hop agents. They migrate from their home platform to some other platform and hop from on the platform to another, visiting as many platforms as required to fulfil their task, e.g. searching for information or goods. Mobile agents differ from "applets", which are programs downloaded as the result of a user action, then executed from beginning to end on one host.

Mobile agents are able to move from one physical network location to another. In this way they can be regarded as an alternative or enhancement of the traditional client/server paradigm. While client/server technology relies on Remote Procedure Calls (RPCs) across a network, mobile agents can migrate to the desired communication peer and take advantage of local interactions. In this way, several advantages can be achieved, such as a reduction of network traffic or a reduction of the dependency of network availability.

Universal Discovery Description and Integration (UDDI) is a specification for distributed Web-based information registries of Web Services. UDDI is also a publicly accessible set of implementations of the specification that allow businesses to register information about the Web Services they offer so that other businesses can find them. A user of the present disclosure may avail himself or herself of personalized services, tied to a SMARTPages®- or UDDI-like catalog service, but does not require that the user reveal personally identifiable information.

FIG. 1 is a schematic diagram of exemplary interactions between participants in exemplary embodiments of platform architecture of the present disclosure. Referring now to FIG. 1, Web user Joe (100) signs up for a profile service with the Profile Service Provider. Joe has a trust relationship with this provider, and configures his preferences through a profile configuration interface. He configures his preferences to provide various levels of access to his profile information or to receive information from vendors and the like. For example, Joe (100) chooses whether to receive promotional offers. Joe (100) chooses, at his option, to specify particular merchants or categories of product to receive promotional offers. One embodiment of the present disclosure provides a profile configuration web site linked to product/company catalogs such as SMARTPages®, Web Services registries like UDDI, and the like.

Joe (100) establishes simple rules during the profile configuration to specify policies as to how his profile information is shared and how or whether offers are communicated to him (step 1). At this point, Joe (100) has configured a "profile agent" (120) that accepts his profile configuration and acts as an agent on his behalf. Optionally, Joe (100) downloads a specialized client to interact with the profile agent and to communicate his decisions to the agent.

In one exemplary scenario, which takes place over a public mobile network, Joe (100) wanders around a PSE mall with a PDA. Merchants (130) in the mall detect Joe's device. In one instance, Joe (100) has a Wifi device and his device attempts to connect up to Wifi access points operated by the merchants. In another instance, Joe (100) has a GPS-enabled cell phone (110), and merchant (130) sites have registered with the cell phone operator to be notified of a new user's presence in the "cell" (step 2). The network operator's "presence service" notifies all registered sites in the "cell" (110). Note that the merchant sites do not know, and do not need to know, Joe's identity. In fact, Joe, or any other user in the cell, does not have a pre-existing relationship with the merchant or the merchant site, and, in accordance with the present disclosure, the merchant site does not require any pre-existing relationship with Joe or any other user.

At Joe's option, such notification is anonymous. For example, the operator may generate a one-time opaque identification token (only valid while Joe remains in the cell) to identify Joe. Alternatively, the privacy policies set in Joe's presence detection preferences determine the notification. Specific embodiments of the present disclosure contemplate that machines in the mall, such as a Coke® machine, are enabled with, for example, Bluetooth® technology and are able to recognize Joe's device using Bluetooth® discovery or a functionally equivalent technology.

The merchant site discovers Joe's "profile agent" (120). In the Wifi case, the agent sends the URL for Joe's profile agent to the access point. In the cellular network, the merchant site receives the profile URL as part of the presence notification. In the Bluetooth case, the profile agent URL is sent along with the discovery negotiation protocol.

The merchant queries the profile agent to receive Joe's profile information. The profile agent presents a Web Service interface and returns the profile information (filtered by Joe's privacy preferences) to the merchant (step 3). At Joe's option, the profile information revealed does not contain personally identifiable information. The merchant optionally uses the return profile information to generate a personalized offer, such as, for example, a discount coupon, and returns it to the profile agent (step 4).

The profile agent applies Joe's policies to the generated offer (step 5) to decide whether to forward the offer to Joe's device. If the offer is sent to the device, Joe reviews the offer using the profile agent client on his device (step 6). If Joe decides to "accept" the offer, this is communicated back to the merchant site (step 7). The merchant, to optionally validate the offer, uses a discount code relayed back to Joe (step 8).

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in all its aspects. Although the disclosure has been described with reference to particular means, materials and embodiments, the disclosure is not intended to be limited to the particulars disclosed; rather, the disclosure extends to all functionally equivalent technologies, structures, methods and uses such as are within the scope of the appended claims.

What is claimed is:

1. A device, comprising:
   a processing system including a processor; and
   a memory that stores executable instructions that, when executed by the processing system, facilitate performance of operations, comprising:
   receiving a user profile associated with a mobile device, the user profile including profile policies and preferences;
   sending a portion of the user profile to a profile agent associated with the mobile device, wherein the profile agent is distinct from the mobile device, and wherein the portion comprises an opaque user profile;
   transmitting a wireless signal to identify the mobile device, wherein the wireless signal is received at a wireless access point of a merchant, wherein a presence of the mobile device in a geographic area is detected by the wireless access point according to the wireless signal, wherein the wireless access point receives, from the profile agent, a uniform resource locator for accessing the opaque user profile responsive to detecting the presence of the mobile device, wherein a one-time identification token is included in the opaque user profile, and wherein a network operator transmits the one-time identification token to the profile agent responsive to the detecting the presence of the mobile device;
   receiving from the profile agent an advertisement of the merchant, wherein the advertisement is generated by the merchant based on the access to the opaque user profile via the uniform resource locator and the detecting the presence of the mobile device in the geographic area, wherein the profile agent determines whether to send the advertisement by applying the profile policies and preferences of the user profile;
   presenting the advertisement at the mobile device;
   receiving a response to the advertisement at the mobile device; and
   sending the response to the advertisement to the profile agent.

2. The device of claim 1, wherein the advertisement includes an offer by the merchant.

3. The device of claim 1, wherein the identification token is generated by a source other than the mobile device.

4. The device of claim 1, wherein the identification token includes an identity of a user of the mobile device.

5. The device of claim 1, wherein the profile agent provides the uniform resource locator for accessing the opaque user profile to the wireless access point of the merchant further responsive to verifying a credential supplied to the profile agent by the wireless access point.

6. The device of claim 1, wherein the profile agent is a multi-hop agent.

7. The device of claim 1, wherein a client application on the mobile device supports user interaction with the profile agent.

8. The device of claim 1, wherein the opaque user profile inhibits direct communication between the merchant and the mobile device.

9. The device of claim 1, wherein the user profile is received via a user interface.

10. The device of claim 9, wherein the user interface is linked to product catalogs, company catalogs, or both.

11. A method comprising:
    receiving, by a processing system including a processor, a user profile associated with a mobile device, the user profile configured through a user interface and including profile policies and preferences;
    sending, by the processing system, a portion of the user profile to a profile agent associated with the mobile device, wherein the profile agent is distinct from the mobile device, and wherein the portion comprises an opaque user profile;
    transmitting, by the processing system, a wireless signal to identify the mobile device, wherein the wireless signal is received at a wireless access point of a merchant, wherein a presence of the mobile device in a geographic area is detected by the wireless access point according to the wireless signal, wherein the wireless access point receives, from the profile agent, a uniform resource locator for accessing the opaque user profile responsive to detecting the presence of the mobile device, wherein a one-time identification token is included in the opaque user profile, and wherein a network operator transmits the one-time identification token to the profile agent responsive to the detecting the presence of the mobile device;
    receiving, by the processing system from the profile agent, an advertisement of the merchant, wherein the advertisement is generated by the merchant based on the access to the opaque user profile via the uniform resource locator and the detecting the presence of the mobile device in the geographic area, wherein the profile agent determines whether to send the advertisement by applying the profile policies and preferences of the user profile;
    presenting, by the processing system, the advertisement at the mobile device;
    receiving, by the processing system, a response to the advertisement at the mobile device; and
    sending, by the processing system, the response to the advertisement to the profile agent.

12. The method of claim 11, wherein the identification token includes an identity of a user of the mobile device.

13. The method of claim 11, wherein the profile agent provides the uniform resource locator for accessing the opaque user profile to the wireless access point of the merchant further responsive to verifying a credential supplied to the profile agent by the wireless access point.

14. The method of claim 11, wherein a client application on the mobile device supports user interaction with the profile agent.

15. The method of claim 11, wherein the opaque user profile inhibits direct communication between the merchant and the mobile device.

16. A non-transitory machine-readable medium comprising executable instructions that, when executed by a processing system including a processor, facilitate performance of operations, comprising:
    receiving a user profile associated with a mobile device, the user profile including profile policies and preferences;
    sending a portion of the user profile to a profile agent associated with the mobile device, wherein the profile agent is distinct from the mobile device, and wherein the portion comprises an opaque user profile;
    transmitting a wireless signal to identify the mobile device, wherein the wireless signal is received at a wireless access point of a merchant, wherein a presence of the mobile device in a geographic area is detected by the wireless access point according to the wireless signal, wherein the wireless access point receives, from the profile agent, a uniform resource locator for accessing the opaque user profile responsive to detecting the presence of the mobile device, wherein a one-time identification token is included in the opaque user profile, and wherein a network operator transmits the one-time identification token to the profile agent responsive to the detecting the presence of the mobile device;

receiving from the profile agent an advertisement of the merchant, wherein the advertisement is generated by the merchant based on the access to the opaque user profile via the uniform resource locator and the detecting the presence of the mobile device in the geographic area, wherein the profile agent determines whether to send the advertisement by applying the profile policies and preferences of the user profile;

presenting the advertisement at the mobile device;

receiving a response to the advertisement at the mobile device; and sending the response to the advertisement to the profile agent.

17. The non-transitory machine-readable medium of claim 16, wherein the user profile is configured through a user interface.

18. The non-transitory machine-readable medium of claim 16, wherein the profile agent provides the uniform resource locator for accessing the opaque user profile to the wireless access point of the merchant further responsive to verifying a credential supplied to the profile agent by the wireless access point.

19. The non-transitory machine-readable medium of claim 16, wherein a client application on the mobile device supports user interaction with the profile agent.

20. The non-transitory machine-readable medium of claim 16, wherein the opaque user profile inhibits direct communication between the merchant and the mobile device.

* * * * *